(12) United States Patent
Loewe

(10) Patent No.: US 7,237,590 B2
(45) Date of Patent: Jul. 3, 2007

(54) TIRE PRESSURE MAINTENANCE DEVICE

(76) Inventor: Richard Loewe, 12882 Olympia Way, Santa Ana, CA (US) 92705

( * ) Notice: Subject to any disclaimer, the term of this patent is extended or adjusted under 35 U.S.C. 154(b) by 0 days.

(21) Appl. No.: 11/273,116

(22) Filed: Nov. 14, 2005

(65) Prior Publication Data

US 2006/0102268 A1    May 18, 2006

Related U.S. Application Data

(60) Provisional application No. 60/627,256, filed on Nov. 12, 2004.

(51) Int. Cl.
    B60C 23/10    (2006.01)
(52) U.S. Cl. ...................... 152/419; 152/418
(58) Field of Classification Search ............... 152/415, 152/418, 419
    See application file for complete search history.

(56) References Cited

U.S. PATENT DOCUMENTS

| | | |
|---|---|---|
| 1,128,455 A | 2/1915 | Keith |
| 1,254,903 A | 1/1918 | Hall |
| 1,744,405 A | 1/1930 | McCord |
| 1,894,908 A | 1/1933 | Hopkins |
| 2,084,381 A | 6/1937 | Campbell |
| 2,211,935 A | 8/1940 | Parker |
| 2,415,618 A | 2/1947 | West |
| 3,971,425 A | 7/1976 | Tsuruta |
| 4,061,200 A | 12/1977 | Thompson |
| 4,157,530 A | 6/1979 | Merz |
| 4,269,252 A | 5/1981 | Shapiro |
| 4,349,064 A | 9/1982 | Booth |
| 4,570,691 A | 2/1986 | Martus |
| 4,651,792 A | 3/1987 | Taylor |
| 4,742,857 A | 5/1988 | Gandhi |
| 5,119,856 A | 6/1992 | Zarotti |
| 5,325,901 A | 7/1994 | Olney |
| 5,325,902 A | 7/1994 | Loewe |
| 5,335,540 A | 8/1994 | Bowler |
| 5,355,924 A | 10/1994 | Olney |
| 5,452,753 A | 9/1995 | Olney |
| 5,472,032 A | 12/1995 | Winston |
| 5,505,080 A | 4/1996 | McGhee |

(Continued)

FOREIGN PATENT DOCUMENTS

DE    1011756    7/1957

(Continued)

*Primary Examiner*—Jason R. Bellinger
(74) *Attorney, Agent, or Firm*—Stetina Brunda Garred & Brucker

(57) ABSTRACT

A device is provided for maintaining a desired inflation pressure within a tire mounted on a wheel of a vehicle. The device includes a microcompressor and a magnetic element. The compressor is mounted on the wheel and is in fluid communication with the atmosphere and the tire. The magnetic element is mounted on a stationary member of the wheel assembly and produces a magnetic field. The compressor is activated by transiting the magnetic field during each wheel revolution. Alternatively, an electric coil mounted on the wheel may transit the magnetic field to generate electrical power for an electrically-driven compressor. Thus, the compressor may pump air into the tire to maintain the desired inflation pressure. For leaks or device failure, a driver may be notified and a battery can operate the compressor at a high rate to maximize tire use until a safe place is reached.

17 Claims, 8 Drawing Sheets

U.S. PATENT DOCUMENTS

| | | |
|---|---|---|
| 5,556,489 A | 9/1996 | Curlett |
| 5,558,730 A | 9/1996 | Olney |
| 5,591,281 A | 1/1997 | Loewe |
| 5,616,196 A | 4/1997 | Loewe |
| 5,667,606 A | 9/1997 | Renier |
| 5,928,444 A | 7/1999 | Loewe |
| 6,691,754 B1 | 2/2004 | Moore |
| 6,742,386 B1 | 6/2004 | Larson |
| 6,744,356 B2 | 6/2004 | Hamilton et al. |

FOREIGN PATENT DOCUMENTS

| | | |
|---|---|---|
| JP | 60148705 | 5/1985 |

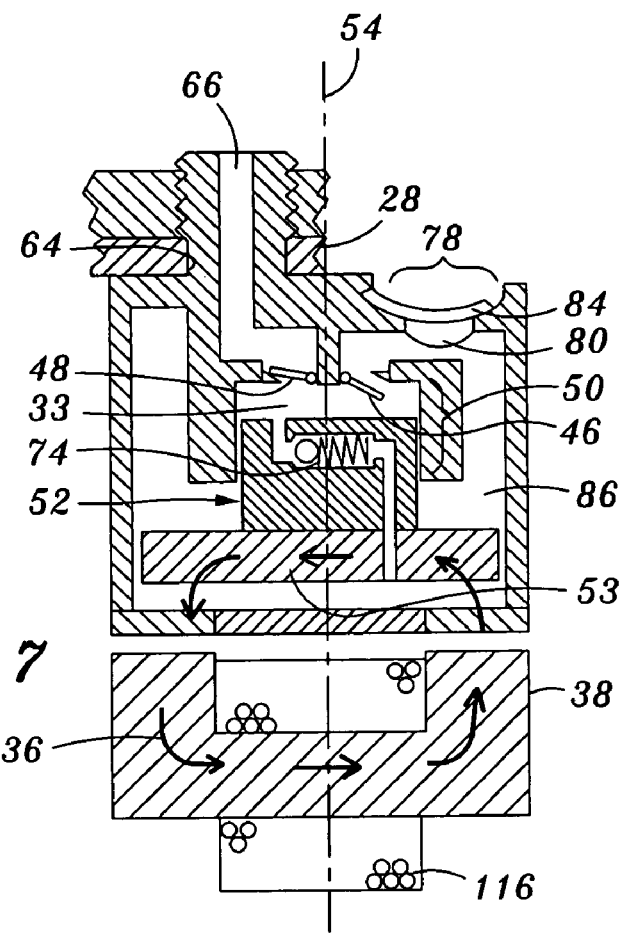

TIRE PRESSURE MAINTENANCE DEVICE

CROSS-REFERENCE TO RELATED APPLICATIONS

The present application claims priority to provisional application Serial No. 60/627,256 filed on Nov. 12, 2004.

STATEMENT RE: FEDERALLY SPONSORED RESEARCH/DEVELOPMENT

Not Applicable

BACKGROUND

The present invention relates generally to vehicle tire pressure maintenance, and more specifically, to tire pressure maintenance devices contained on a wheel of a vehicle that automatically regulate and maintain a desired tire inflation pressure or amount of air in a tire.

Under-inflation of vehicle tires is dangerous, deadly, and common. Under-inflation is involved in hundreds of thousands of accidents, tens of thousands of injuries, and hundreds of fatalities annually in the U.S. During 2000, a large number of SUV rollovers and deaths were attributed to significantly under-inflated tires, bringing significant attention to the problem. In hope of reducing the unacceptably high rate of accidents, injuries, and deaths related to under-inflation, the United States Congress passed the TREAD Act of 2000 that requires a warning system in new motor vehicles to indicate to the operator when a tire is significantly underinflated. Consequently, the National Highway Traffic Safety Administration (NHTSA) proposed a safety standard requiring that as of 2007, all new passenger cars, trucks, multipurpose passenger vehicles, or busses under 10,000 pounds must be equipped with a tire pressure monitoring system (TPMS) to warn a driver when any tire is under-inflated by 25% or more. The program is estimated to cost well over $1 billion annually.

However, even if the controversial TPMS program achieves its estimates it will reduce under-inflation related accidents by about 20%. Many industry experts doubt that it will help at all. A device that automatically maintains proper tire inflation will eliminate almost all accidents, injuries, and deaths due to under-inflation. In addition, an effective tire pressure maintenance device will improve fuel efficiency by about 2% and will reduce tire tread wear by about 10%, more than paying for the devices and saving many billions of dollars annually in the U.S. if in widespread use.

The temperature of air in a tire has a major effect on the pressure of air in the tire that must be considered in any approach to tire pressure maintenance. FIG. 1 shows how tire pressure varies with temperature according to the ideal gas law. The four pressure-temperature (PT) lines illustrate the pressure-temperature behavior of a tire filled to 32 psi at air temperatures of 20, 40, 60, and 80° F., assuming a constant tire volume. The four PT lines represent four different amounts of air in the tire. Ambient temperature variations and tire heating from rolling make tire temperatures and pressures move up and down along the PT line denoting the amount of air in the tire. A tire will move to a higher PT line only when air is added and to a lower line only when air is released or leaks out of the tire.

As shown in FIG. 1, the pressure in a tire increases and decreases about 1 psi with temperature increases and decreases of 10° F. Normally, as a car is-driven the temperature in the tire increases about 2 to 5 psi above its "cold" pressure (at ambient temperature) due to the heat caused by flexing of the side-walls and friction from road contact. The recommended manual tire inflation procedure is to fill tires monthly to the manufacturer's recommended cold pressure (MRCP or "placard" pressure) at ambient temperature. In practice, tires are usually filled less often and while warm from driving. An ambient temperature drop of 50° F., possible within a day and common within a month, reduces tire pressure by about 5 psi. Thus, tire pressures frequently fall 8 psi below the MRCP, typically 25%, without considering the normal leak rate of about 1 psi per month. Most under-inflation is due to inadequate manual tire pressure maintenance and it is killing and maiming people at an unacceptable rate.

Two approaches to automatic tire pressure maintenance goals are:
1) Constant Pressure—maintains the MRCP independent of temperature by adding air when the warm tire pressure is below its warm objective (about 3 psi above the MRCP); and
2) Constant Amount of Air—maintains the amount of air in the tire that produces the MRCP at a selected temperature by adding air any time the tire temperature and pressure fall below the related PT line.

Both approaches replace air that leaks from tires and assure less variation from the MRCP than manual inflation procedures, with or without a TPMS. The constant amount of air approach will minimize deviations from the PT line due to temperature changes and will minimize the amount of air pumped into a tire to maintain the desired inflation pressure.

Many patents have been granted on approaches to automatically maintain the desired inflation pressure in pneumatic tires. None address temperature variation significantly. Of the related approaches, one involves a difficult generation of two continuous out of phase A.C. voltages that are rectified to provide a continuous D.C. power source for a D.C. motor-driven air compressor on the wheel. Another discloses a battery operated compressor contained on a wheel with no practical means for recharging the battery. Another requires a TPMS or an on-wheel pressure sensor to send low tire pressure data from the wheel to the vehicle body in order to activate an electromagnet that drives a compressor on the wheel. However, none have produced a practical device. Therefore, there are needs in the art for a tire pressure maintenance means that:
automatically maintains proper tire inflation without operator attention or maintenance;
is small, simple, practical, inexpensive and that provides long term reliable operation;
is self-contained on a wheel assembly and operated by wheel rotation;
is fail safe such that failures do not cause deflation or over-inflation of a tire;
alerts drivers to excessive tire leaks or failures of the pressure maintenance means; and
provides a higher emergency inflation rate to mitigate leak rates and increase the time for drivers to reach a safe place.

BRIEF SUMMARY

A new device automatically maintains a desired inflation pressure of an interior of a tire mounted on a wheel of a vehicle. A magnetic element is attached to a stationary part of a wheel assembly and a compressor, such as a microcompressor that is mounted on the rotating wheel, passes near the magnet, thereby magnetically activating the compressor. The magnetic element, which may be a stationary permanent magnet or electromagnet, may thus be used as the driving element, and several magnetically-driven compressor configurations are disclosed herein. The compressor may perform at least one cycle per wheel revolution and may replace normal car tire leakage. Alternatively, an electrical coil can be mounted on the wheel to pass near the magnetic element, thereby inducing voltage pulses in the coil to provide on-wheel electrical power to run an electrically-driven compressor that is mounted at another location on the wheel.

Various embodiments of the device using such a magnetic element include:

1) A stationary permanent magnet drives an on-wheel magnetically activated compressor.
2) A stationary electromagnet drives an on-wheel magnetically activated compressor.
3) A stationary permanent magnet and an on-wheel coil drive an on-wheel electrically activated compressor.
4) A stationary electromagnet and an on-wheel coil form an intermittent split transformer that transfers electrical power to the wheel to drive an on-wheel electrically activated compressor and exchanges pulse coded data between the wheel and vehicle frame.

As mentioned above, the magnetic element is mounted on the stationary member of the wheel assembly, such as a brake housing, at a radial distance from the axis of rotation. The compressor or coil may be mounted on the wheel such that it passes near the magnet during each revolution of the wheel. The magnetic element produces a magnetic field, which creates a magnetic force on the compressor. Additionally, a bias force, which opposes the magnetic force, may be produced by a bias member or source within the compressor, by centrifugal force upon the compressor, or by another magnet or pole. In one embodiment, the magnetic force and the bias force cause a piston to reciprocate within a cylinder. When the pressure in the compression chamber exceeds the actual tire pressure and does not exceed the desired inflation pressure, the compressor's output valve opens and compressed air flows into the tire. Thus, the compressor maintains the desired inflation pressure of the tire in response to transiting the magnetic field.

One of the simplest, smallest embodiments of the present invention uses a stationary permanent magnet and a magnetically activated compressor on the wheel. A magnet in the compressor provides a continuous bias force that holds the compression chamber closed, except when it is overpowered by passing near the magnet (whose magnetic force is stronger than the bias force) off the wheel that briefly opens the compression chamber, thus creating the reciprocating motion of the compressor. The bias force may vary the desired inflation pressure with temperature to match the ideal gas law, thereby regulating the amount of air in the tire to produce the desired inflation pressure at a selected temperature. A compressor that will supply 0.001 to 0.002 cubic inch of free air to a tire each wheel revolution is capable of increasing a normal car tire pressure by 1 psi within 50 to 100 miles of driving, well above normal leakage rates. Such a magnetically-driven compressor may occupy a fraction of a cubic inch and weigh a fraction of an ounce. The device can be added to a Tire Pressure Maintenance System (TPMS) equipped vehicle, but a TPMS may add little value to a vehicle equipped with a device that maintains the desired tire pressure.

An alternative embodiment uses a stationary electromagnet and a rotating electrical coil on the wheel to form an intermittent split pulse transformer briefly during each revolution as the coil passes the stationary electromagnet. The intermittent transformer transfers electrical power from the vehicle to the wheel and provides two-way pulse communication between the vehicle and wheels. The electrical power on the wheel activates an electrically-driven compressor to maintain the desired tire inflation and provides power to on-wheel electronics. An on-wheel electronic controller may manage compressor operation and control two-way communication with a central controller on the vehicle. It sends data on compressor utilization or output flow rate to the central controller from which too high a rate suggests a leak, and too low a rate suggests a device failure. The central controller warns the driver of either such condition by a simple display. Addition of a small rechargeable battery whose charge is maintained by power from the transformer provides reserve power to run the compressor at high speed to mitigate rapid leaks, increasing time to reach safety before the tire goes flat.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7 is a cross-section view of a compressor when adjacent to the stationary electromagnet wherein a bias force on the piston is created by centrifugal force of the rotary motion of the compressor;

FIG. 8 is an oblique view of a magnetically-driven compressor that is activated by passing each pole of an electromagnet;

DETAILED DESCRIPTION

Figure 2:
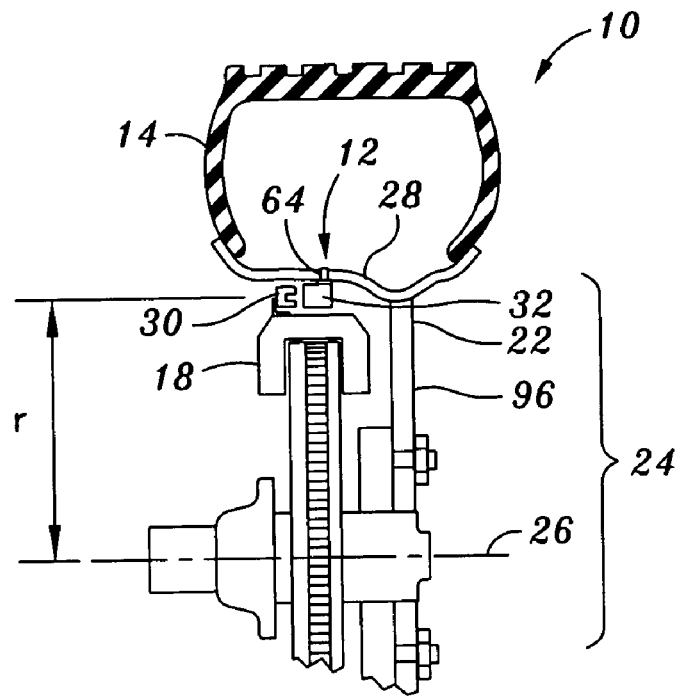
FIG. 2 is a partial cross-section view of an exemplary automobile wheel assembly showing an example location of a magnetic element on a stationary disc brake caliper housing and a magnetically-driven compressor located on a wheel rim at a time when the wheel rotation places them adjacent in accordance with an embodiment of the present invention.

Referring now to the drawings wherein the showings are for purposes of illustrating the preferred embodiments of the present invention and not for purposes of limiting the same, FIG. 2 is a cross-section view of a partial automobile wheel assembly 10 and a device 12 for maintaining a desired inflation pressure of an interior of a tire 14 by using the rotation of the wheel 22 with respect to the wheel assembly 10. As is known in the art, various configurations exist for vehicle wheel assemblies 10. Wheel assemblies are generally movably attached to a vehicle frame by a suspension and in some cases, by a steering mechanism. For simplicity, the embodiments of the present invention will be discussed with reference to generic elements that are commonly present in most wheel assemblies 10. However, as will be understood, implementations of the present invention may be retrofitted into a variety of existing wheel assemblies 10 or designed into new wheel assemblies 10 of differing configurations.

Wheel assemblies 10 may include many members that do not rotate with the wheel 22, some of which, such as a brake assembly, retain a very close relationship with the wheel. Such items are referred to hereafter as stationary members, meaning stationary with respect to a wheel assembly 10. Although they may move with respect to the vehicle frame, they do not rotate with the wheel.

Figure 3:
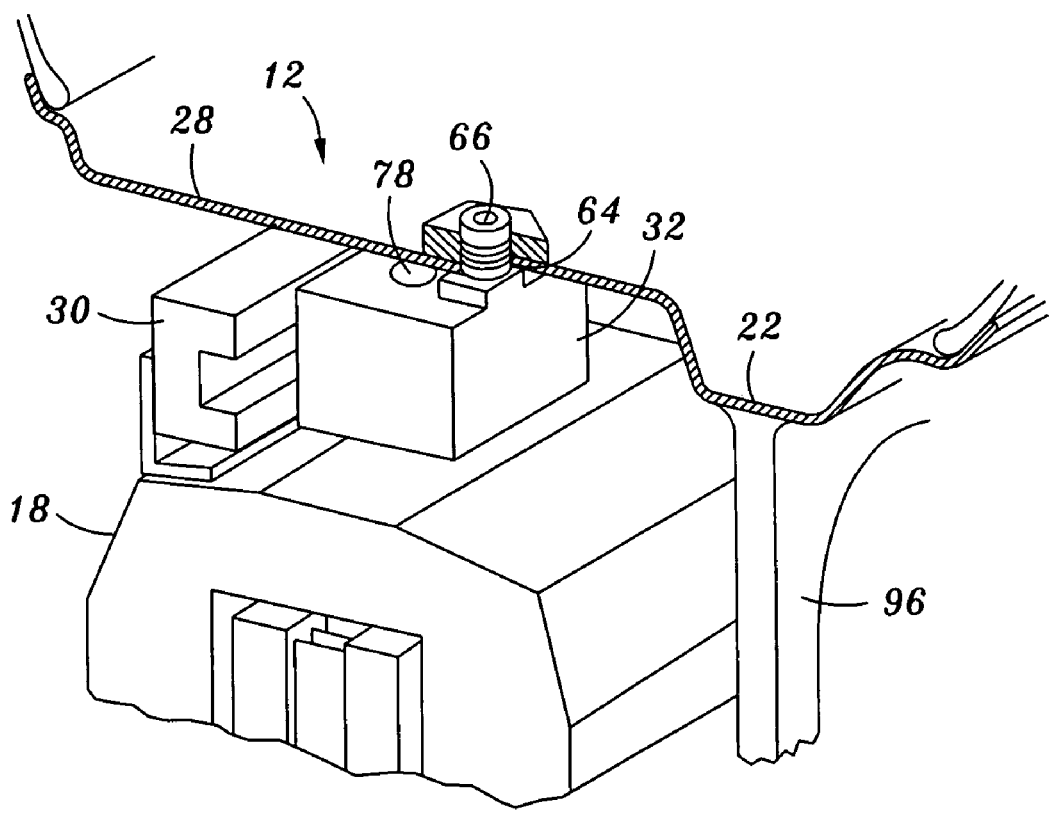
FIG. 3 is an oblique view illustrating the magnetic element and compressor arrangement of FIG. 2 in greater detail.
Figure 4:
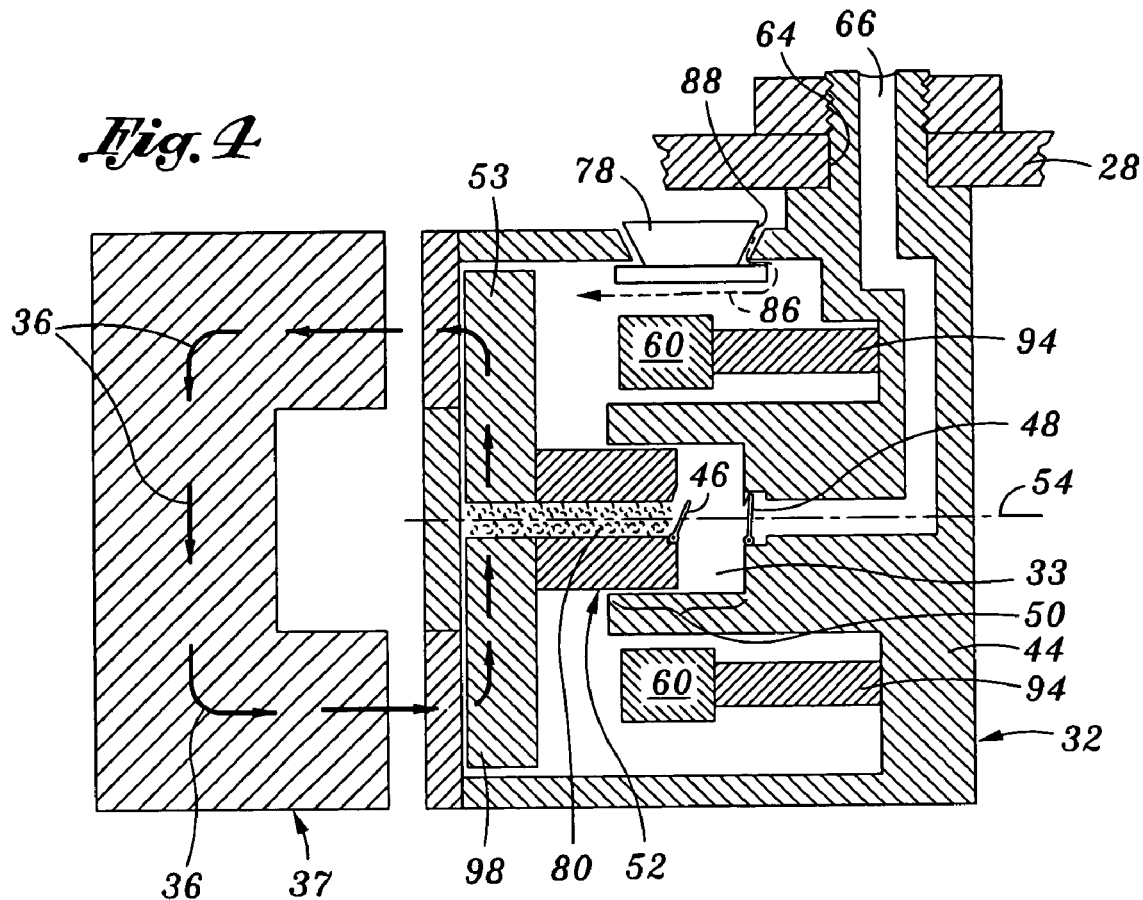
FIG. 4 is a cross-section view of a compressor that includes a cylinder and a piston with a magnetic actuator and bias magnets, depicted at a position adjacent to the stationary permanent magnet.
Figure 5:
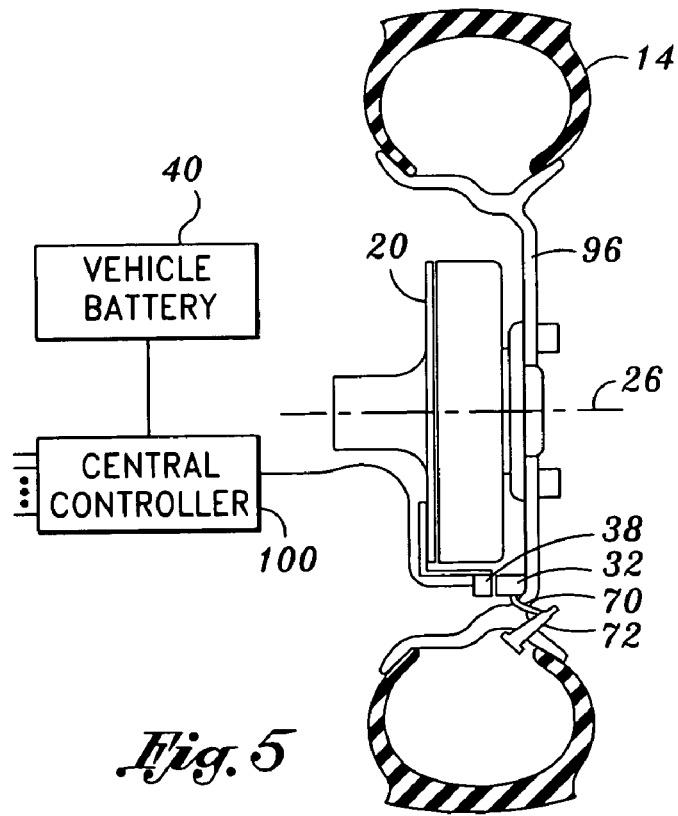
FIG. 5 is a partial cross-section view of another example arrangement on an automobile wheel assembly with a stationary electromagnet and a magnetically-driven compressor wherein the compressor output is connected to a tire valve stem by a pneumatic tube.
Figure 10:
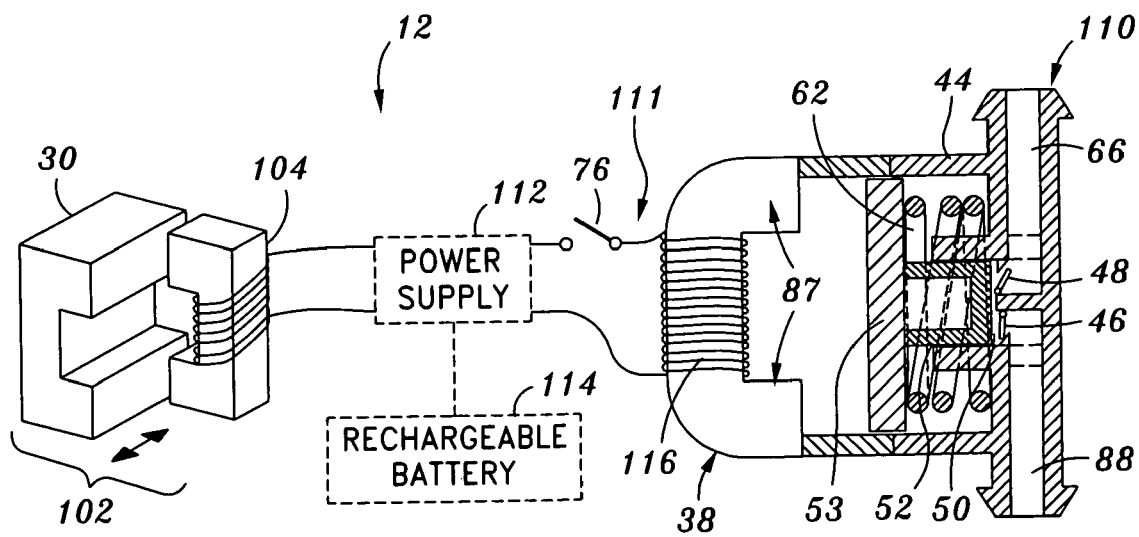
FIG. 10 is a schematic diagram of the arrangement in FIG. 9 showing the optional addition of a power supply and rechargeable battery and illustrating use of a bias member, depicted as a compression spring.

As shown in FIG. 2, the wheel assembly 10 includes a stationary member such as a disc brake caliper housing 18, a drum brake backing plate 20, as shown in FIG. 5, as well as any other of a variety of stationary members of a wheel assembly 10. Further, FIGS. 2 and 3 also illustrate that the wheel assembly 10 includes a wheel 22 that defines an interior portion 24 and an axis of rotation 26. It is contemplated that the interior portion 24 of the wheel 22 may refer to numerous locations along the wheel 22, such as a wheel rim 28 or a wheel spoke 96. The tire inflation device 12 comprises at least one magnetic element 30 on the stationary member and a compressor 32 that rotates with the wheel 22. The magnetic element 30 is mounted on the stationary member at a radial distance r from the axis of rotation 26. According to an embodiment of the present invention shown in FIG. 4, the magnetic element 30 is operative to produce a magnetic field 36 that the magnetically-driven compressor 32 transits once per wheel revolution. The magnetic element 30 may be a stationary permanent magnet 37, as shown in FIG. 4, or an electromagnet 38, as shown in FIG. 10. The electromagnet 38 may be powered by receiving a current from a power source 40, such as a vehicle battery 42.

The compressor 32 is mounted on the interior portion 24 of the wheel 22. Thus, as the wheel 22 rotates relative to the stationary member of the wheel assembly 10 the compressor 32 transits the magnetic field 36 during each revolution of the wheel 22. In response to the presence of the magnetic field 36, the compressor 32 operates to maintain the desired inflation pressure within the tire 14 by intaking air from the atmosphere, compressing the air, and outputting the air into the tire 14. Thus, the compressor 32 is in fluid communication with the atmosphere and the tire 14. The compressor 32 may be a magnetic compressor. The compressor 32 includes a compressor body 44. FIGS. 2, 3 and 4 illustrate the relationship of the compressor 32 with respect to the magnetic element 30 as the compressor 32 transits the magnetic field. As shown in these FIGS., the magnetic element 30 and the compressor 32 are disposed at approximately the same radial distance 34 from the axis of rotation 26, and the compressor 32 is positioned to pass close to the magnetic element 30. It is contemplated that various modifications to the general configuration may be implemented so as to further enhance the magnetic communication of the magnetic element 30 and the compressor 32 and to facilitate mounting on various wheel assemblies 10.

In addition to the features already mentioned, the device 12 further includes means for regulating output pressure of the compressed air to the desired inflation pressure. As will be noted further below, the regulation of the output pressure of the compressed air may be accomplished without off-wheel aid. Thus, embodiments of the present invention may operate independent of controllers, regulators, or other devices and provide an independent, self-sufficient device that maintains the desired inflation pressure within the tire 14.

Referring now to FIG. 4, there is illustrated a cross-section view of the stationary permanent magnet 37 and the compressor 32 as the compressor 32 transits the magnetic field 36. The compressor 32 may include an intake valve 46, an output valve 48, a centrifugal valve 78, an intake plenum 86, and an intake port 88. The intake port 88 and the centrifugal valve 78 are operative to intake air into the compressor 32. The intake valve 46 is operative to intake air into the compression chamber 33, and the output valve 48 is operative to output air from the compression chamber 33 into the output port 66, which is in fluid communication with the tire 14. The compressor 32 utilizes the intake and output valves 46, 48 to maintain the desired inflation pressure of the tire 14.

In the embodiment shown in FIG. 4, the compressor 32 includes a compression chamber 33 and an actuator. The compression chamber 33 defines a chamber volume, which volume may be increased or decreased by the action of the actuator. The compressor 32 may include a cylinder 50 and a piston 52. The portion of the cylinder 50, not occupied by the piston 52, in which air is compressed, is referred to as the compression chamber 33. The piston 52 may include a piston base 53, as shown in FIG. 4. In the embodiments shown in FIGS. 4 and 10, the actuator is the piston base 53 of the piston 52. The piston 52 is slidably positionable within the cylinder 50 to reciprocate between input and output positions. The output position is shown in FIG. 10. The piston base 53 may be ferromagnetic to be responsive to magnetic forces. The cylinder 50 is in fluid communication with the intake and output valves 46, 48. Further, the cylinder 50 may define a cylinder axis 54. As shown in FIGS. 2 and 3, the compressor 32 may be mounted with the cylinder axis 54 being parallel to the axis of rotation 26 to allow the motion of the compressor's piston 52 to be orthogonal to the centrifugal force created by the rotation of the wheel 22. As the compressor 32 passes the magnet 30, it passes through the magnetic flux path which follows the path of the magnetic field 36 as shown by the arrows. The magnetic flux path of the magnetic field 36 passes through the air gap and ferromagnetic piston base 53 and permanent magnet 37. It should be noted that the magnetic field 36, which is well-known in the art as being a three-dimensional phenomenon, is represented by the two dimensional magnetic flux path shown in the figures. The magnetic element 30 may be wider than the compressor 32 in the direction of relative motion to lengthen the time that the full magnetic force is applied to the compressor 32 as it transits the magnetic field.

Figure 6A:
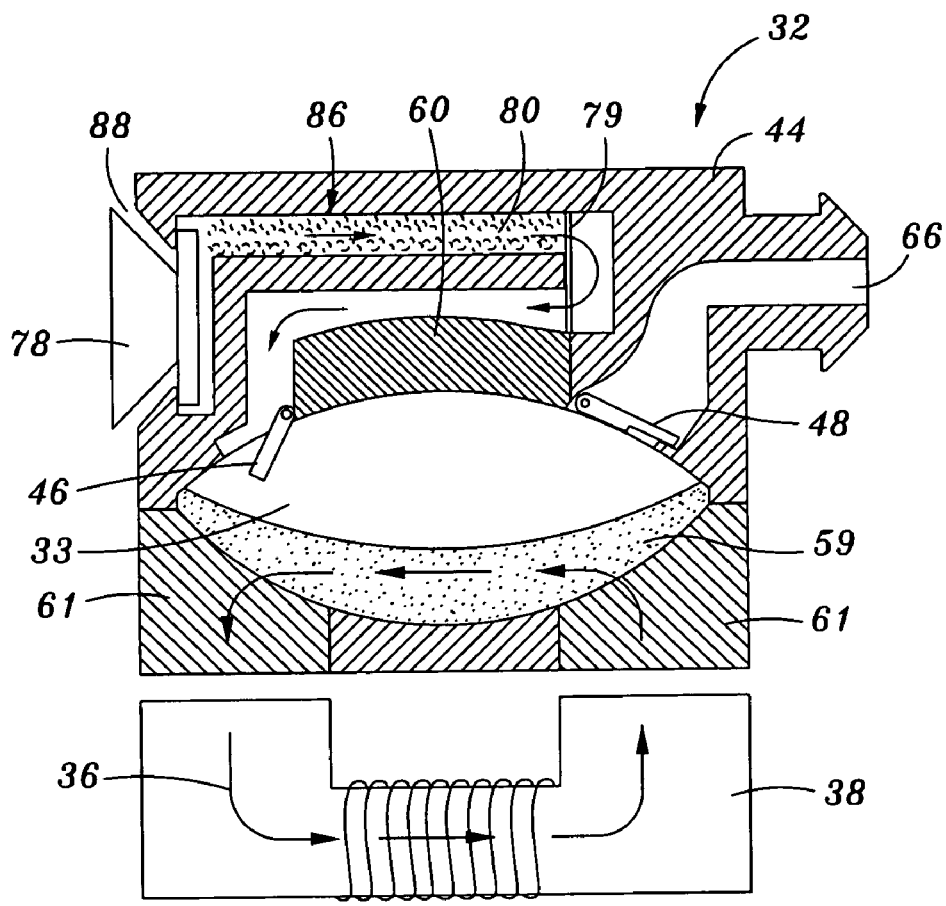
FIG. 6A is a cross-sectional view of an intake position of a magnetic diaphragm compressor when passing the stationary electromagnet.
Figure 6B:
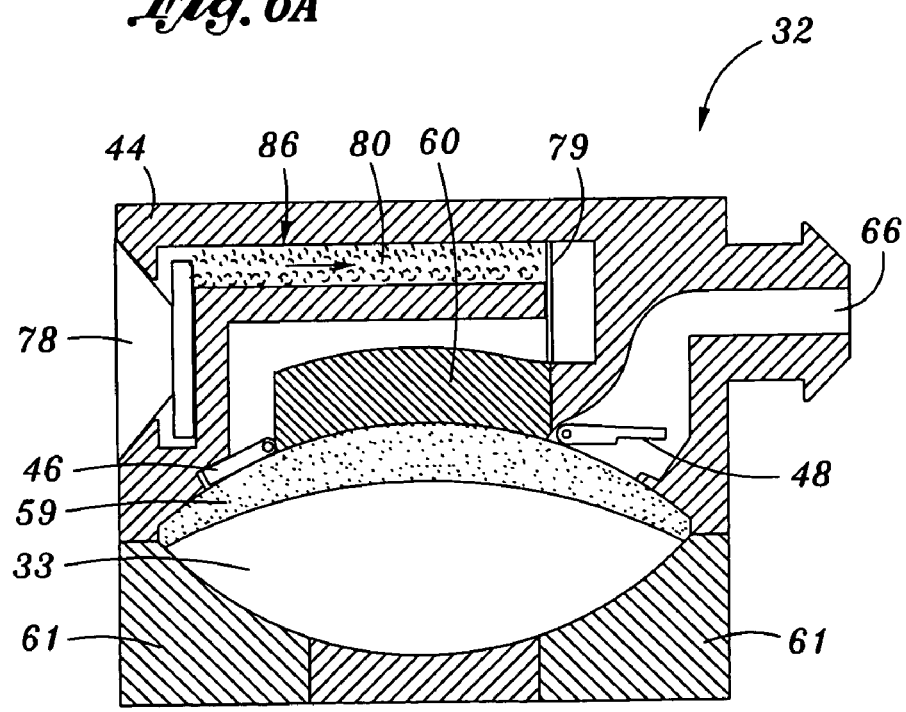
FIG. 6B is a cross-sectional view of an output position of the magnetic diaphragm compressor whose output is connected by pneumatic tube to the tire valve stem as shown in FIG. 5.

Referring still to FIG. 4, the air path through the compressor 32 begins at the centrifugal valve 78 at the intake port 88 which may be held closed by bias magnets 60 at vehicle speeds below a predetermined speed (e.g. 15 mph) at which the centrifugal force expels potential liquid or solid contaminants preventing their entry through the centrifugal valve 78. Above that predetermined speed, the centrifugal force on the centrifugal valve 78 overcomes the magnetic bias force holding the centrifugal valve 78 closed and opens the centrifugal valve 78 to allow clean air to enter the intake plenum 86. The compressor body 44 around the centrifugal valve 78 may be shaped to modify the air flow to deflect airborne particles away and reduce pressure differences due to the Bernoulli Effect. The intake plenum 86 may occupy spare space within the compressor 32 between the centrifugal valve 78 and the intake valve 46, and may include a membrane 79 that passes air, but resists passage of water, as shown in FIGS. 6A and 6B. Air may also flow through an air filter 80 that may be in the piston 52 (as shown in FIG. 4) or in the intake plenum 86 (as shown in FIG. 6A) and then through the intake valve 46 into the compression chamber 33.

An intake stroke of the piston 52 may occur as the compressor 32 transits the magnetic field and the magnetic force on the piston base 53 draws the piston 52 outward of the cylinder 50. The outward movement of the piston 52 increases the volume of the compression chamber 33 and creates a partial vacuum in the compression chamber 33 that opens the intake valve 46 and draws air in from the intake plenum 86 through a filter 80. The intake stroke, as may be visualized from FIG. 4, is performed as the piston 52 moves toward an intake position. The intake position is achieved when the piston 52 is positioned with the compression chamber 33 substantially having a maximum chamber volume. The piston 52 is further operative to expel air from the cylinder 50 into the tire 14 via the output valve 48 as the piston 52 moves toward an output position during an output stroke, in which the piston 52 is positioned with the compression chamber 33 substantially having a minimum chamber volume. The output stroke is performed when the piston 52 moves away from the magnetic element 30 which reduces the volume of the compression chamber 33 and causes the air within the cylinder 50 to be evacuated therefrom and expelled into the tire 14. The intake and output valves 46, 48 are preferably check valves. Thus, as the cylinder 50 intakes air, the output check valve 48 may insure that no air from the tire 14 enters the cylinder 50. Further, when the cylinder 50 is expelling air into the tire 14, the intake check valve 46 may insure that no air intended for the tire 14 exits through the intake valve 46.

According to another embodiment of the present invention, as shown in FIG. 4, two bias magnets 60 apply a bias force on the ferromagnetic piston base 53 (magnetic actuator) that holds the piston in the output position minimizing the volume of the compression chamber 33. When the compressor rotates to the position adjacent the stationary magnet 37, as shown in FIG. 3 and 4, the magnetic force applied by the magnet 37 on the piston base 53 overpowers the bias force and pulls the piston 52 out on the intake stroke, maximizing the volume of the compression chamber 33. As mentioned above, this creates a partial vacuum in the compression chamber 33 and draws air into the compression chamber 33 from the intake plenum 86 through the intake check valve 46. As the compressor 32 passes the magnet 37 the magnetic flux follows the path 36 as shown by the arrows in FIG. 4 through the air gaps, the ferromagnetic piston base 53, and magnetic element 37. The magnetic element 37 may be wider than the compressor 32 in the direction of relative motion to lengthen the time that the full magnetic force is applied to the piston base 53 as it transits the magnetic field.

As the compressor transits the stationary magnet 37 the bias force on the piston base 53 returns the piston 52 to an output position on an output stroke. As the volume of the compression chamber 33 is reduced the air is compressed. If the maximum pressure provided by the bias force is less than the tire pressure that appears in the output port 66 the output valve 48 remains closed and no air is forced into the tire 14. If the pressure created in the compression chamber 33 by the bias force exceeds the tire pressure, the output valve 48 opens and air flows into the output port 66. Thus, selecting or adjusting the bias force to the desired inflation pressure fixes the maximum pressure to be applied to the tire 14 and is used to establish the desired tire inflation pressure. For example, if the bias force on the piston base is 1.7 pounds and the piston area is 0.05 square inches, the bias pressure is 34 psi, the maximum pressure produced. The bias force for a device is selected or adjusted to the desired tire pressure, typically the MRCP (manufacturer's recommended cold pressure or "placard pressure"), at the average ambient temperature.

The compressed air enters the tire 14 from the output port 66 through fluid communication with a penetration 64 (hole) of the rim 28, as in FIGS. 2, 3, and 4, or alternatively by a pneumatic tube 70 to a valve stem 72, as shown in FIG. 5. As shown in FIG. 4, the intake and output valves 46, 48 may provide two one-way check valves that prevent air from flowing backwards from the tire 14 through the compressor 32 in the event of a valve failure in the open position.

As shown by FIGS. 2 and 3, the compressor 32 may be mounted with the cylinder axis 54 being parallel to the axis of rotation 26 to allow the motion of the compressor's piston 52 to be orthogonal to the centrifugal force created by the rotation of the wheel 22. Each revolution of the wheel 22 causes one cycle of the compressor 32, forcing a tiny amount of air into the tire 14 when the tire pressure is below the desired inflation pressure. The compressor may be sized to overcome a nominal tire leakage rate of about 1 psi per month and a minimum number of miles a vehicle may travel monthly.

Although it is preferred that the magnetic element 30 drive the input stroke and the bias member 60 drive the output stroke, it is contemplated that the magnetic element 30 may drive the output stroke and that the bias force may drive the input stroke of the piston 52.

The bias member 60 may be selected or adjusted to provide a fixed bias force at a selected temperature that determines the desired fixed pressure that the compressor 32 maintains in the tire 14 when warm (normally the MCRP plus 2 or 3 psi). Providing a calibrated adjustment to the bias force may permit manual change of the desired tire pressure to adapt to seasons, loads, or other conditions. If a tire is inadvertently filled with too much air the normal tire leak rate will gradually correct this without compressor operation.

Figure 1:
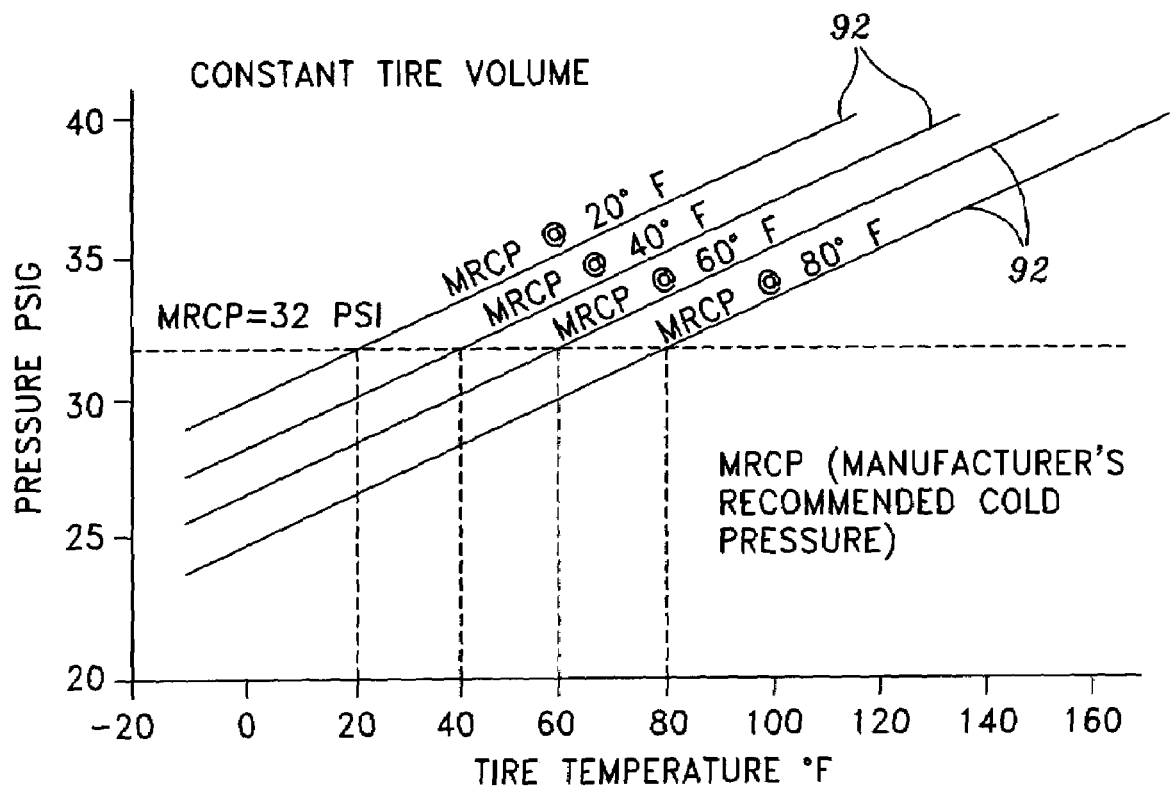
FIG. 1 is a graph showing the relationship of air pressure and temperature along pressure-temperature lines in a tire filled with four different amounts of air to the manufacturer's recommended cold pressure (MRCP) at different temperatures.

Two alternative approaches to tire safety may be followed utilizing embodiments of the present invention. First, one may seek to fix the desired inflation pressure at the MRCP or other pressure as desired. As such, the compressor 32 may be required to add air to the tire 14 to compensate for pressure losses due to leaks or drops in the ambient temperature. As an alternative to the fixed pressure approach, one may seek to maintain constant the amount of air in the tire 14. Specifically, one may seek to maintain constant the mass of air particles in the tire 14. For example, the compressor 32 may vary the bias force with temperature to make the desired inflation pressure approximate a selected PT line 92 in FIG. 1. This is achieved by maintaining a constant ratio of absolute pressure to absolute temperature in the tire. This maintains the amount (mass) of air in the tire 14 constant at the amount of air that produces the MRCP at the chosen average ambient temperature. Each PT line 92 in FIG. 1 represents the PT relationship of a specific amount of air in the tire 14 according to the ideal gas law (PV=nRT), assuming constant volume. For example, the compressor 32 may be configured to follow the PT line 92 that intersects the horizontal MRCP 32 psi line at 60° F. That line becomes the desired PT line 92 for the compressor 32. To maintain the desired amount of air in the tire 14, the bias force is increased with temperature to increase the desired inflation pressure with temperature. The bias member's 60 mounting may be configured to vary the bias magnets' 60 position with temperature thereby changing the bias force with temperature to approximate the selected PT line. The compressor 32 adds air to the tire 14 when the pressure-temperature (PT point) of the air in the tire 14 is below the desired PT line 92.

During installation of the device 12, the bias force of the compressor 32 may be selected or adjusted to follow a desired PT line 92 ("compressor's PT line") that intersects the MRCP at an average ambient temperature for the area of use. The tire pressure normally stays on a PT line determined by the amount of air in the tire. Of course, occasional additions by the compressor 32 to the amount of air in the tire 14 will be required due to leakage in the tire 14. In other words, the compressor 32 maintains the amount of air in the tire 14 constant, and the pressure of the tire 14 may fluctuate with temperature. This Constant Amount of Air approach may require adding less air to the tire and may keep the tire pressure closer to the desired pressure than the simpler Constant Pressure approach. Thus, in the fixed-amount-of-air alternative, only when air is added or released (or escapes) will the tire move to a higher or lower PT line. If the tire's PT point is below the compressor's PT line 92, the compressor 32 pumps a small amount of air into the tire 14 each wheel 22 revolution. If the tire's PT point is above the compressor's PT line 92, no air is pumped into the tire 14 and normal leaks bring the tire's PT point down to the compressor's PT line 92. Using this fixed-amount-of-air paradigm, the compressor 32 replaces leakage air and maintains the amount of air in the tire 14 nearly constant, keeping it on the selected compressor PT line 92 and minimizing the amount of air that must be added to the tire 14.

The bias magnets 60 may be mounted at one end of temperature sensitive positioning rods 94 that establish the separation of the bias magnets 60 from the piston base 53 for three purposes: (1) to select the compressor's PT line 92; (2) to vary the desired inflation pressure with temperature to match the selected PT line 92; and (3) to offset the bias magnets' decreasing strength with increasing temperature. The positioning rods 94 establish the separation of the bias member 60 from the piston base 53 at the end of the output stroke. The positioning rod has a high thermal coefficient of expansion (TCE) and is mounted to provide good thermal communication with the air in the tire. By configuring the TCE materials, their exposure to the air in the tire, and the separation of the bias magnets from the piston base, the desired inflation pressure provided by the bias force may be established.

Figure 9:
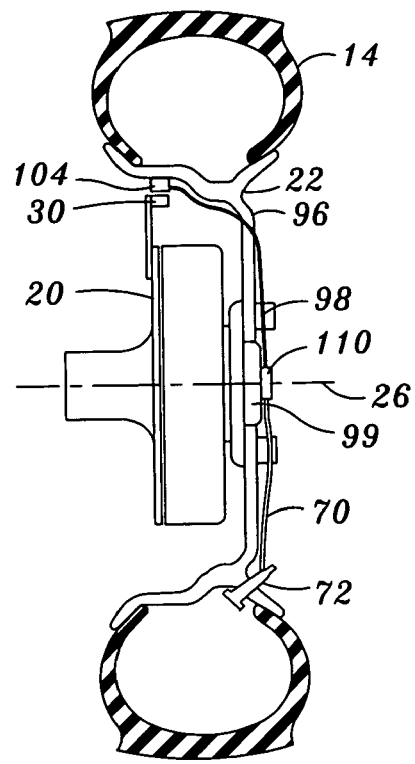
FIG. 9 is a partial cross-section view of an exemplary automobile wheel assembly wherein the stationary permanent magnet is mounted on a drum brake backing plate of the wheel assembly where an electrical coil, mounted on a wheel rim, passes close to the magnetic element and is in electrical communication with an electrically-driven compressor located over a wheel hub and in fluid communication with the valve stem via the pneumatic tube.
Figure 11:
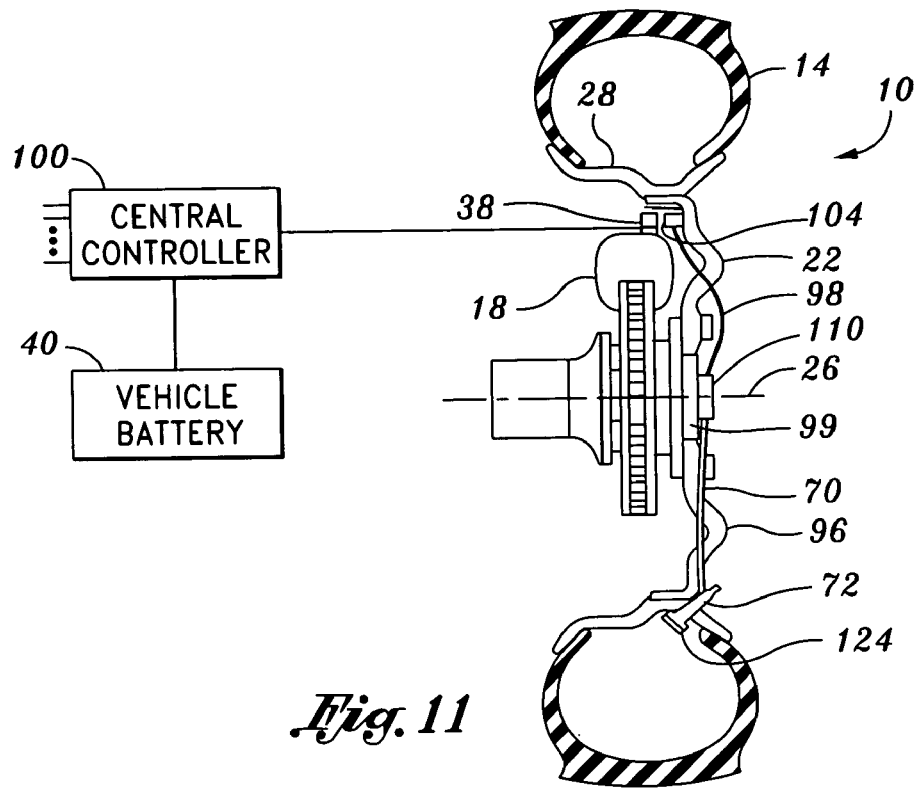
FIG. 11 is a cross-section view of a partial automobile wheel assembly with an electromagnet mounted on a disc brake caliper housing and an electrical coil mounted on a wheel spoke thereby forming an intermittent split transformer for transferring electrical power from the vehicle to the wheel and for communicating between the wheel and a central controller on the vehicle.

FIGS. 5, 9, and 11 illustrate other example mounting arrangements and FIGS. 6A, 6B, 7, and 8 illustrate other example embodiments of magnetic elements 30 and magnetically-driven compressors 32. These figures are generally schematic illustrations of concepts rather than realistic design illustrations. For simplicity, centrifugal valves, filters, and means to vary the desired inflation pressure with temperature are not shown in all cases, although they are contemplated. In most embodiments the compressor may be mounted to the wheel rim 28 as shown in FIGS. 2 and 3 or to a wheel spoke 96 as shown in FIGS. 9 and 11. Its output may be by a direct penetration of the rim 28 by attaching the output port 66 through a hole 64 in the rim as shown in FIGS. 2 and 3 or by pneumatic tube 70 to the wheel's valve stem 72. The magnetic element 30 may be attached to the brake housing 18 as shown in FIG. 2 or any other stationary member of the wheel assembly 10 where the compressor 32 can be mounted to pass close to it. The shapes and sizes of magnetic members may assume many varied configurations. FIGS. 7 and 10 illustrate different biasing means using centrifugal force or a spring for the biasing force.

FIG. 5 shows an example mounting with an electromagnet 38 mounted on a drum brake backing plate 20 and the compressor 32 mounted on the wheel spoke 96 with a pneumatic tube 70 connecting the output port 66 of the compressor 32 to the valve stem 72. The central controller 100 directs current from the vehicle battery 41 to an electromagnet winding 116, as shown in FIG. 8, to produce the magnetic field 36 only while the compressor 32 transits the magnetic field 36. It may determine the location and speed of the compressor on the wheel using a Hall Effect sensor to sense the passing of a small signal magnet mounted on the wheel a known angle from the compressor 32. It then determines the speed and position of the compressor and the time of its next transit.

Referring now to FIGS. 6A and 6B, the electromagnet 38 and magnetically-driven diaphragm compressor 32 embodiment whose intake position is illustrated in FIG. 6A and output position is illustrated in FIG. 6B may be used in the mounting configuration in FIG. 5. In this embodiment, the actuator is a ferromagnetic diaphragm 59. A short pneumatic tube attached to the port 66 conveys the output air to the tire 14 via its valve stem 72. The magnetic element is shown as an electromagnet 38, although it may just as well be a permanent magnet 37. The diaphragm 59 preferably comprises ferromagnetic particles embedded in a flexible diaphragm material. FIG. 6A shows the compressor 32 adjacent the magnetic element 38 where the flexible magnetic actuator 59 is magnetically drawn to the intake position by the electromagnet 38, drawing air into the compression chamber 33 from the intake plenum 86 through the filter 80 and the intake check valve 46. FIG. 6B shows the flexible magnetic diaphragm 59 held in the output position by the bias magnet 60, forcing the compressed output air out of the compression chamber 33 through the output check valve 48. The compressor body 44 is mostly non-magnetic, but includes two ferromagnetic pole extenders 61 that effectively shorten the air gap between the magnetic element 30 and the flexible magnetic actuator.

FIG. 7 illustrates an embodiment using centrifugal force on the piston 52 and piston base 53 as the bias force to drive the piston's output stroke. The compressor 32 is oriented such that the cylinder axis 54 is perpendicular to the axis of rotation 26 and parallel with the centrifugal force created by the rotation of the compressor 32 about the axis of rotation 26. As such, the centrifugal force acts as a continuous bias force on the piston base 53 and the piston 52 that drives the piston 52 toward the output position, compressing the volume of the compression chamber 33. The compressed air exits through the output valve 48 and the output port 66 that penetrates the wheel rim 28. The magnetic element is shown as an electromagnet 38 but can alternatively be a permanent magnet. As the compressor 32 passes the electromagnet 38 the electromagnet 38 is pulsed by a central controller 100 creating the magnetic field 36 that draws the piston base 53 toward the intake position on the intake stroke, overcoming the centrifugal bias force on the piston 52. Because the centrifugal bias force varies with vehicle speed, it is not usable to limit the pressure to the desired inflation pressure. Rather, a pressure limit valve 74 may be located in the piston 52 to release air from the compression chamber 33 to the intake plenum 86 when the pressure in the compression chamber 33 exceeds the desired tire inflation pressure, thereby limiting the output pressure to that at which the limit valve 74 opens. The ball and spring pressure limit valve 74 shown is oriented perpendicular to the cylinder axis 54 as shown in FIG. 7 to prevent centrifugal force from affecting limit valve 74 operation. Alternatively, the pressure limit valve 74 may be placed at the output port 66 to release air to the atmosphere or to the intake plenum 86 when pressure in the output port 66 exceeds the desired tire inflation pressure. In this case, another check valve is placed between the tire 14 and the pressure limit valve 74 to prevent a failure of the pressure limit valve 74 from releasing air from the tire 14 to the atmosphere or intake plenum 86. The centrifugal valve 78 uses a disc spring 84 to continuously force the valve plug into the valve seat and uses centrifugal force to overcome the bias spring 84 force and open the centrifugal valve 78 at a predetermined vehicle speed.

The embodiments described above involve one compressor cycle of one intake stroke and one output stroke on each passage of the compressor 32 by the magnetic element 30. Such embodiments assume that one stroke, such as the intake stroke, occurs during the time period that the compressor is passing the magnetic element 30. The other stroke occurs during the balance of the wheel revolution. Other embodiments may reverse the input and output strokes.

However, FIG. 8 shows a magnetic configuration that may provide two compressor cycles on one transit of the magnet element 38 by the compressor 32. The compressor 32 transits two separated poles 87 of the magnetic element 38. Transit of each pole 87 initiates one of an intake stroke and an output stroke in the compressor 32. While the compressor 32 is passing between the two poles 87, the magnetic field 36 from the magnetic element 38 falls off and the bias force initiates the other one of the input and output stroke. If the space between poles 87, the speed of rotation of the wheel 14, and the speed of the strokes are properly balanced, the first two strokes will end before the compressor 32 reaches the second pole 87 and initiates another intake stroke. Thus, with some configurations, more than one compressor cycle can be completed during one wheel revolution.

Whereas magnetic fields of opposite polarity have the same attracting effect on non-magnetized ferromagnetic material, magnetic fields of opposite polarity will attract or repel a permanent magnet, depending on the arrangement of the magnetic poles 87. Unlike poles attract and like poles repel. Thus, if the actuator is magnetic, such as if the piston base 53 is a permanent magnet, the compressor 32 may undergo alternating intake and output strokes upon passing two opposite poles 87 of the stationary magnetic element 30 separated in the direction of relative motion. This result may thus be accomplished without a bias force, and result in two strokes per wheel revolution. Embodiments without a bias force may use a pressure limit valve 74 as described above to establish and regulate the desired tire inflation pressure.

All of the embodiments described above use a magnetically-driven compressor. The following embodiments use an electric coil 104 to transit the magnetic field 36 of the magnetic element 30 and relay the induced electrical energy received by the coil 104 to an electrically-driven compressor 110. FIG. 9 illustrates an example arrangement showing a coil 104 connected by wire 98 to an electrically-driven compressor 110 mounted over a wheel hub 99 and sending the output air through a pneumatic tube 70 to the valve stem 72. As the electrical coil 104 transits a magnetic field 36, a pulse of one polarity is induced as the coil 104 enters the magnetic field 36 and a pulse of opposite polarity is induced as the coil 104 leaves the magnetic field 36, if the field 36 is wider than the coil 104. Further, it is also possible that if the pulses are far enough apart, they may each drive an intake stroke and produce two compressor cycles in one wheel revolution, which may also work in previously discussed embodiments if the compressor 32, and not the coil 104 transits the magnetic field 36. Such electrical pulses may directly drive an electrically-driven compressor 110. Almost any magnetically-driven compressor configuration may be converted to an electrically-driven compressor by attaching an electromagnet 38 that produces the type of magnetic field needed by the magnetically-driven compressor 32.

FIG. 10 illustrates an embodiment that uses the arrangement in FIG. 9. The compressor 110 is shown using a compression spring 62 as the bias member to provide the bias force that drives the output stroke. An alternative to using the bias force is to establish the desired inflation pressure using a pressure activated switch 76. The switch 76 may be activated by a sensor that senses the pressure in the output port 66 of the compressor 110 and open a circuit 111 from the coil 104 to the compressor 110 when the output pressure is higher than the desired tire inflation pressure, thereby causing the compressor 110 to stop operating. When the compressor 110 is mounted over the wheel hub 99, as shown in FIG. 9, the centrifugal valve 78 may be located sufficiently off the axis of rotation 26 for proper operation and be in fluid communication with the intake port 88 of the compressor 110 by another pneumatic tube 70. The intake pneumatic tube 70 may be filled with a filter material as an added precaution.

An electronic power supply 112 may be provided to convert the electrical power received from the electrical coil 104 to a form best suited to drive any type of electrically-driven compressor 110. As mentioned, any of the magnetically-driven compressor 32 embodiments described above may be converted to an electrically-driven compressor 110 by attaching an electromagnet 38, as shown in FIG. 10. Any type of electrically-driven compressor may be used, such as a diaphragm compressor, solenoid-driven compressor, stepping motor compressor, or a D.C. or A.C. motor-driven compressor. Electrical energy may be stored by a capacitor or by a small rechargeable battery 114 that is kept charged by rectified pulses from the coil 104.

Furthermore, the electromagnet 38 may be configured to change the polarity of its poles 87 by reversing the direction of current through the electromagnet's winding 116, permitting more configurations. An unmagnetized actuator with a bias force and a magnetic element 30 with two wide poles 87 that are widely separated in the direction of relative motion may effect two compressor cycles during one complete transit of the magnetic element 30 by the compressor 32. If the output of the electrical coil 104 is sent to an electromagnet 38 driving a compressor 110, as shown in FIG. 10, and if the piston base 53 is a permanent magnet, then the two pulses of alternating polarity would drive one compressor cycle from one transit of the coil 104 past the magnet 30, without a bias member 60. A direct electrical connection may be provided from the coil 104 to the compressor, as shown in FIG. 10. With the magnetic element configuration in FIG. 8, one transit produces the four induced pulses of opposite polarity that may effect two complete compressor cycles on one wheel revolution.

In addition, any of the capabilities described above to augment the magnetically-driven compressors 32 may be added to electrically-driven compressors 110, including a centrifugal valve 78, pressure activated switch, and bias force pressure regulation. If the configuration in FIG. 10 is used with a TPMS, a switch similar to switch 76 may be activated by the TPMS controller, enabling more sophisticated control of the pressure-temperature relationship.

Figure 12:
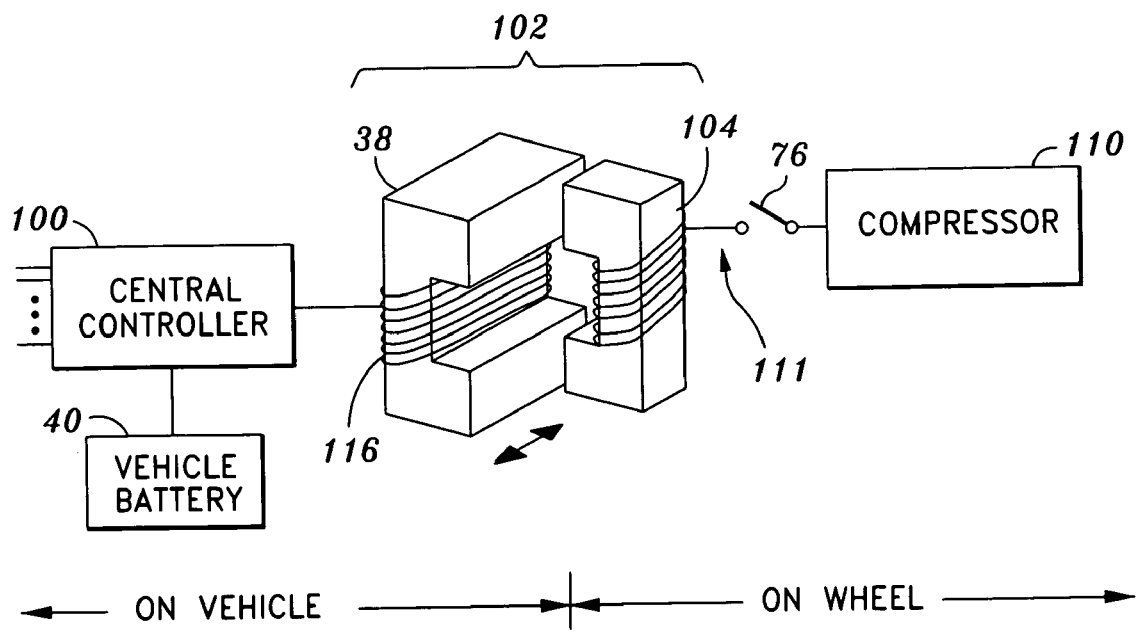
FIG. 12 is a schematic diagram of the electromagnet and electrical coil forming an intermittent split pulse transformer that provides induced electrical pulses directly to the electrically-driven compressor.
Figure 13:
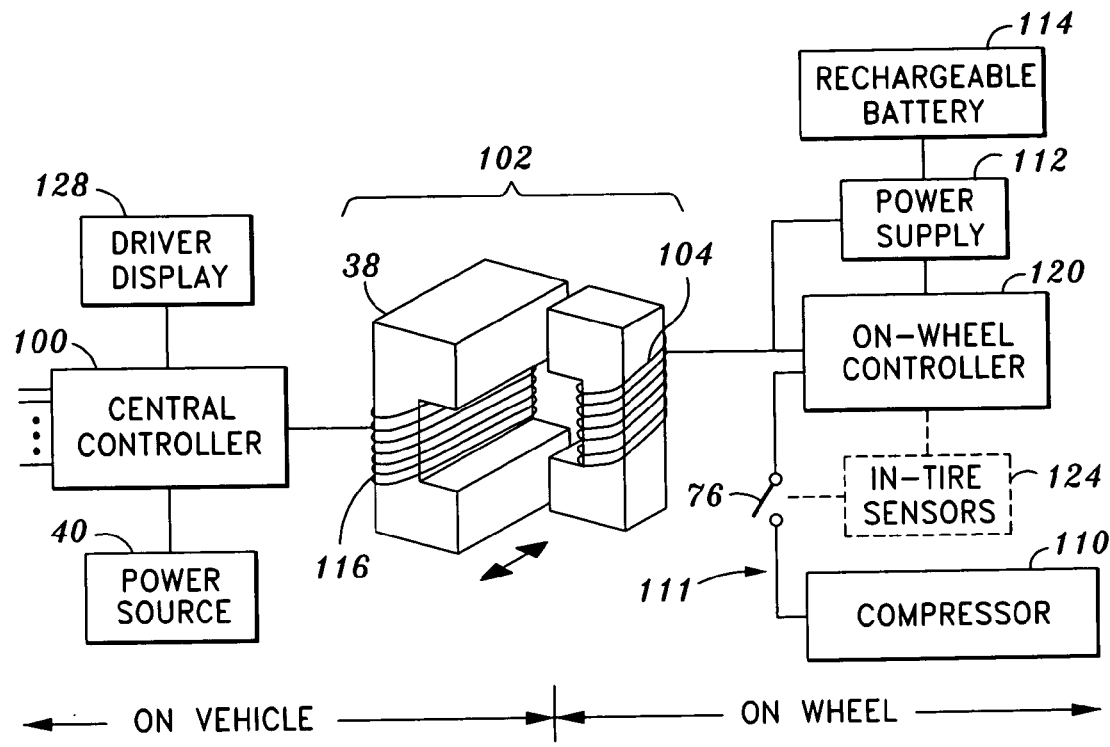
FIG. 13 is a schematic diagram of an embodiment using the intermittent split pulse transformer to transfer electrical power from the vehicle to operate the electrically-driven compressor and on-wheel electronics, and to transfer pulse coded data in both directions between the vehicle frame and the wheel to alert a driver to suspected leaks or failures.

FIGS. 11 and 12 illustrate another embodiment using an electromagnet 38 for the magnetic element, and an electrical coil 104 that may transit the magnetic field. The combination of electromagnet 38 and electric coil 104 form an intermittent split pulse transformer 102 with a two-piece core. The transformer 102 may comprise two separate pieces, with the electromagnetic winding 116 on the electromagnet 38 serving as a primary winding on its portion of the transformer core, and the electrical coil 104 serving as a secondary winding and its portion of the core. The primary winding of the electromagnet 38 is mounted on a stationary element of a wheel assembly. The secondary winding of the electrical coil 104 is mounted on the wheel 22 where it passes near the primary winding once each wheel revolution, which induces an electronic voltage variation in the coil 104. The split transformer 102 is operative during the period in which the two core portions are close enough to provide good magnetic communication. As discussed herein, the transformer 102 may be used in a variety of manners. For example, the transformer 102 may provide power to other components for assisting in maintaining tire pressure, such as controllers, sensors, electrical energy storage devices, and/or compressors. As shown in FIG. 13, the output of the transformer 102 on the wheel may feed an on-wheel electronic power supply 112 that provides power in the form needed by on-wheel electronic elements and may also recharge a storage capacitor or a rechargeable battery 114 to store electrical energy for later use. Further, the transformer 102 may transfer pulse coded data in both directions between the vehicle frame and the wheel 22. Those familiar with the TPMS may recognize FIG. 14 as a combination of a TPMS and pressure maintenance device (compressor 110) where the transformer 102 may serve the TPMS or compressor 110 or both. An on-wheel controller 120 may control the compressor 110 based on information from in-tire pressure and temperature sensors 124. A pressure activated switch 76, or pressure limit valve 74, or the bias force may limit the output pressure to the desired tire inflation pressure. The electrically-driven compressor 110 may be located anywhere on the wheel 22, preferably over the wheel hub 99.

Figure 14:
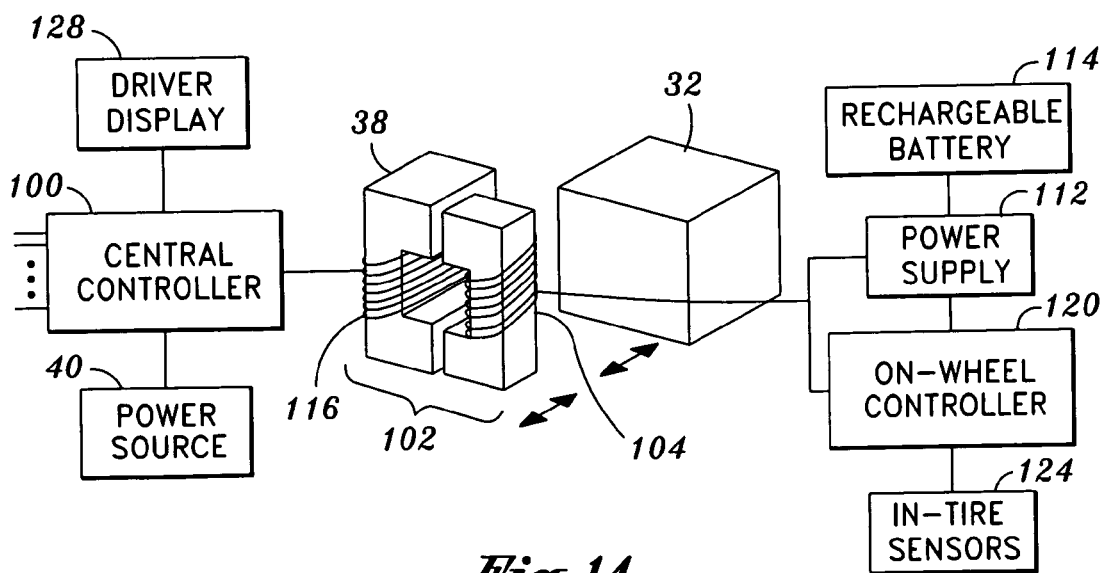
FIG. 14 is a schematic diagram of an embodiment as in FIG. 13 in which the magnetically-driven compressor and the electrical coil pass the electromagnet sequentially, the electrical coil supplying electrical power to only the on-wheel electronics and providing two-way pulse coded communication of alerts and control data between the vehicle and the wheel.

FIG. 13 expands on the embodiment in FIG. 12 by adding an on-wheel controller 120, an on-wheel power supply 112, a simple driver display 128, and a small rechargeable battery 114. The power supply 112, as described above, permits use of any type of electrically-driven compressor and provides power for any on-wheel electronics. The on-wheel controller 120, typically a microprocessor, may control compressor operation and the two-way data communication capability provided by the intermittent transformer 102. The on-wheel controller may receive control instructions from the central controller 100. It sends data regarding at least one of the compressor 110 utilization and output flow rate. The flow rate derived from a sensor in the output port 66 is sent to the central controller 100. The central controller 100 sends an alert to the driver display 128 suggesting a possible leak when the utilization or flow rate of any wheel exceeds a predetermined threshold for a predetermined period. Similarly, it sends an alert to the driver display 128 when the utilization or flow rate has been zero for a predetermined period, suggesting possible failure of the device 12. The alerts indicate the wheel involved and nature of the alert. The small rechargeable battery 114, illustrated in FIGS. 13 and 14, is kept charged by a charging circuit in the power supply 112, and adds two valuable features. It provides power storage and smoothing for any on-wheel electronics and provides emergency power for brief periods of maximum speed compressor operation for a tire suspected of having a leak. In normal operation, the low duty cycle of power transfer through the intermittent transformer 102 limits compressor operation to that adequate for replacing normal leakage. In an emergency, such as when the driver is notified of a suspected leak, the compressor is operated at its highest speed on continuous power from the battery 114 until the battery 114 is completely discharged. This may allow a driver more time to find a safe stopping place before a leaking tire goes flat. A TPMS may use the two-way communications between the wheel 22 and the vehicle and the rechargeable battery 114 to power the on-wheel electronics.

Addition of temperature and pressure sensors 124 to tires in the FIG. 13 embodiment allows adding the primary function of a TPMS, warning the driver when any tire 14 is significantly under-inflated. However, any value of such TPMS-like warnings is greatly reduced since significant under-inflation is unlikely to occur in this embodiment unless there is a significant leak in a tire or a device failure, which may be sensed and trigger alerts to the driver without in-tire sensors.

FIG. 14 illustrates an embodiment with the same features as in the embodiment in FIG. 13. However, the magnetically-driven compressor 32 and electrical coil 104 transit the magnetic field separately. Thus, a magnetically-driven compressor 32 is used instead of an electrically-driven compressor 110. The coil 104 and power supply 112 serves only the electronics and rechargeable battery 114 and not the compressor 32.

As will be recognized by one of skill in the art, the aforementioned embodiments may be variously modified. For example, multiple pulses may be applied during one transit of a compressor or a coil past an electromagnetic; the magnetic element may be mounted on any stationary member (non-rotating part) of the wheel assembly from which it can be positioned close enough to the rotating compressor or coil; the compressor or electrical coil may be located anywhere that rotates with the wheel and passes near the magnetic element; any of the implementations described above can use multiple magnetic elements and/or multiple compressors or electrical coils on one wheel assembly; the devices may be used on wheels of any type of vehicle with inflatable tires; different types and configurations of magnets, compressors and electrical coils may be used; various combinations of magnets, compressors bias force means, pressure limit means, input and output means, check valves, element mounting means and configurations may be used.

Most of the above combinations of techniques are obviously still valid when some features are omitted. The means of driving a compressor is one of the important features of the present invention, not necessarily the nature of the compressor (therefore, diaphragm, compressors, motor-driven compressors, solenoid compressors, and other types of compressors may also be substituted as viable compressors in embodiments of the present invention).

The above description is given by way of example, and not limitation. Given the above disclosure, one skilled in the art could devise variations that are within the scope and spirit of the invention disclosed herein, including various ways of utilizing or modifying embodiments of the present invention. Further, the various features of the embodiments disclosed herein can be used alone, or in varying combinations with each other and are not intended to be limited to the specific combination described herein. Thus, the scope of the claims is not to be limited by the illustrated embodiments. Other modifications may be variously implemented utilizing the teachings found herein.

What is claimed is:

1. A device for maintaining a desired inflation pressure of an interior of a tire mounted on a wheel of a vehicle, the wheel being rotatably connected to a stationary member of a vehicle wheel assembly and defining an axis of rotation, the device comprising:
    at least one magnetic element being mounted on the stationary member at a radial distance from the axis of rotation, the magnetic element producing a magnetic field;
    a magnetically driven air compressor being mounted on the wheel and being radially disposed from the axis of rotation relative to the magnetic element to transit the magnetic field during each revolution of the wheel, the compressor being in fluid communication with the atmosphere and the interior of the tire, the compressor being operative to intake air from the atmosphere and to output compressed air to the interior of the tire in response to transiting the magnetic field; and
    means for regulating output pressure of the compressor to the desired inflation pressure without off-wheel aid.

2. The device of claim 1 wherein the compressor further includes:
    a compression chamber defining a variable chamber volume;
    an actuator being operative to increase and decrease the chamber volume, the actuator being operative to effect an intake stroke to increase chamber volume and thereby intake air from the environment through an intake check valve, the actuator further being operative to effect an output stroke to decrease chamber volume and thereby expel air through an output check valve; and
    means for applying first and second opposing forces alternately to the actuator, one of the first and second opposing forces increasing the chamber volume and the other of the first and second opposing forces decreasing the chamber volume, at least one of the first and second opposing forces being produced upon transit of the compressor through the magnetic field.

3. The device of claim 2 wherein the compressor further comprises a cylinder and a piston, the piston being slidably positionable within the cylinder, the piston being operative to move to an intake position within the cylinder during the intake stroke to increase the chamber volume thereby intaking air into the cylinder, the piston further being operative to move to an output position within the cylinder during the output stroke to decrease the chamber volume thereby outputting compressed air into the tire, one of the input stroke and output stroke being performed in response to the compressor transiting the magnetic field.

4. The device of claim 2 wherein the compression chamber is bounded on one side by the actuator, the actuator being a flexible magnetically sensitive diaphragm, and being operative to increase the chamber volume to intake air into the compression chamber through the intake valve upon the actuator moving to an intake position during the intake stroke, the actuator further being operative to decrease the chamber volume and expel compressed air from the compression chamber through the output valve upon moving to an output position during the output stroke, one of the input stroke and output stroke being performed in response to the compressor transiting the magnetic field.

5. The device of claim 2 including two magnetic elements and wherein the compressor transits through two magnetic fields produced by the magnetic elements during one revolution of the wheel, both magnetic fields exerting the first opposing force upon the actuator to perform one of the input and output strokes, the second opposing force being exerted upon the actuator to perform the other of the input and output strokes as the compressor moves intermediate the magnetic elements, the alternate exertion of the first and second opposing forces causing the chamber volume to increase and decrease twice during one wheel revolution.

6. The device of claim 2 wherein a plurality of magnetic elements are configured to produce successive magnetic fields of opposite polarity through which the compressor transits during one revolution of the wheel, the input and output strokes being effected by the actuator in response to the magnetic fields of opposing polarity.

7. The device of claim 2 wherein the second opposing force is a continuous bias force being produced by one or more permanent magnets, the second opposing force being configured to be overcome by the first opposing force produced when the compressor transits the magnetic field, the second opposing force causing the actuator to effect one of the input and output strokes after transiting the magnetic field.

8. The device of claim 2 wherein the second opposing force is a bias force being produced by a spring biasing member, the second opposing force being configured to be overcome by the first opposing force produced when the compressor transits the magnetic field, the second opposing force causing the actuator to effect one of the input and output strokes after transiting the magnetic field.

9. The device of claim 2 wherein the second opposing force is the centrifugal force being continuously exerted upon the actuator due to rotation of the compressor about the axis of rotation of the wheel, the second opposing force causing the actuator to effect one of the input and output strokes after transiting the magnetic field.

10. The device of claim 2 wherein the second opposing force is configured to establish and regulate the desired inflation pressure of the tire.

11. The device of claim 2 wherein the compressor further includes an output port and a pressure limit valve, the output port being in fluid communication with the compression chamber with the output valve being open, the pressure limit valve being in fluid communication with one of the output port and the compression chamber, the pressure limit valve being operative to reduce the output pressure of air within the respective one of the output port and the compression chamber to the desired inflation pressure by releasing air from the respective one of the output port and the compression chamber to the atmosphere when the output pressure exceeds the desired inflation pressure.

12. The device of claim 1 wherein the means for regulating the output pressure of the compressor permits manual adjustment of the desired inflation pressure.

13. The device of claim 1 wherein the means for regulating the output pressure of the compressor varies the desired inflation pressure as a function of temperature of the air in the tire.

14. The device of claim 13 wherein the desired inflation pressure changes with the temperature of air in the tire tending to maintain a constant mass of air in the tire.

15. A device for maintaining a desired inflation pressure of an interior of a tire mounted on a wheel of a vehicle, the wheel being rotatably connected to a stationary member of a vehicle wheel assembly and defining an axis of rotation, the device comprising:
at least one magnetic element being mounted on the stationary member at a radial distance from the axis of rotation, the magnetic element producing a magnetic field;
a magnetically driven air compressor being mounted on the wheel and being radially disposed from the axis of rotation relative to the magnetic element to transit the magnetic field during each revolution of the wheel, the compressor being in fluid communication with the atmosphere and the interior of the tire, the compressor being operative to intake air from the atmosphere and to output compressed air to the interior of the tire in response to transiting the magnetic field;
means for regulating output pressure of the compressor to the desired inflation pressure without off-wheel aid;
a compression chamber defining a variable chamber volume;
an actuator being operative to increase and decrease the chamber volume, the actuator being operative to effect an intake stroke to increase chamber volume and thereby intake air from the environment through an intake check valve, the actuator further being operative to effect an output stroke to decrease chamber volume and thereby expel air through an output check valve; and
means for applying first and second opposing forces alternately to the actuator, one of the first and second opposing forces increasing the chamber volume and the other of the first and second opposing forces decreasing the chamber volume, at least one of the first and second opposing forces being produced upon transit of the compressor through the magnetic field
wherein the compressor includes an intake port and a centrifugal valve, the intake port being in fluid communication with the atmosphere, the centrifugal valve being operative to shut off all air entry into the compressor through the intake port while the wheel is rotating below a predetermined speed.

16. The device of claim 2 wherein the magnetic element is an electromagnet controlled by a central controller on the vehicle frame that receives electrical current from a vehicle battery and sends the current through the electromagnet winding to produce the magnetic field, the electromagnet being further operative to produce the current only during periods when the compressor is transiting the magnetic field.

17. The device of claim 16 wherein the actuator is a permanent magnet and two poles of the electromagnet produce magnetic fields of opposite polarity that are transited sequentially by the compressor producing first and second attractive and repulsive opposing forces on the permanent magnet actuator.

* * * * *